Jan. 12, 1971     H. F. VAN DEN BOORN     3,553,914
SUPPORT STRUCTURE FOR A LIGHT DOME

Filed Nov. 14, 1968     2 Sheets-Sheet 1

United States Patent Office 3,553,914
Patented Jan. 12, 1971

---

3,553,914
SUPPORT STRUCTURE FOR A LIGHT DOME
Hubertus Franciscus van den Boorn, Via Regia 141c,
Maastricht, Netherlands
Filed Nov. 14, 1968, Ser. No. 775,787
Claims priority, application Belgium, Nov. 22, 1967,
51,171
Int. Cl. E04b 7/18
U.S. Cl. 52—200                                    1 Claim

ABSTRACT OF THE DISCLOSURE

A support structure for a light dome, comprising an upper support surface, which forms a portion of a cylinder surface and on which a transparent plate member forming the light dome proper may be connected by means of a connecting frame.

BACKGROUND OF THE INVENTION

The invention relates to a support structure for a light dome and to a connecting frame for connectig the light dome to said support structure.

In the present specification the expression "support structure" indicates the structural member which forms the connection between the roof of a building structure, wherein an opening is formed, and the light dome proper.

In known support structures, the light dome is connected on flat horizontal strips. Thus, the light dome to be mounted has to be dome-shaped itself.

Of course, a dome-shaped light dome is more expensive than a flat plate having approximately the same dimensions. Further, upon breakage, the light dome in the known construction may only be replaced by a new light dome having the special shape as required by the construction.

It is an object of the present invention to provide a support structure, which may cooperate with a light dome obtained by deformation of a flat plate, so as to reduce the costs thereof and which accommodates the replacement of a broken light dome by a new light dome made out of a flat plate.

It is a further object of the invention to avoid the necessity, in case of replacement of the light dome, of ordering an element of special shape, which often has a long delivery time and is rather expensive.

SUMMARY OF THE INVENTION

According to the invention, the support structure for a light dome comprises an upper support surface, which forms a portion of a cylinder surface and which is adapted to support a transparent bent plate member forming the light dome proper.

Preferably, said upper support surface consists of an upper support frame comprising two portions extending in parallel with the axis of said cylinder surface and two portions with an arcuate central line extending in a plane perpendicular to the axis of said cylinder surface.

In one embodiment of the present invention, the support structure further comprises a lower support frame adapted to support a further transparent plate member. Said lower support frame may extend in the plane subtending said upper support surface.

The invention further relates to a connecting frame for connecting a transparent plate member forming the light dome proper to the support structure as hereinbefore described.

According to the invention, said connecting frame comprises profiled strips, which may be fittingly connected to the upper support surface of the support structure.

DESCRIPTION OF THE PREFERRED EMBODIMENT

Figure 1:
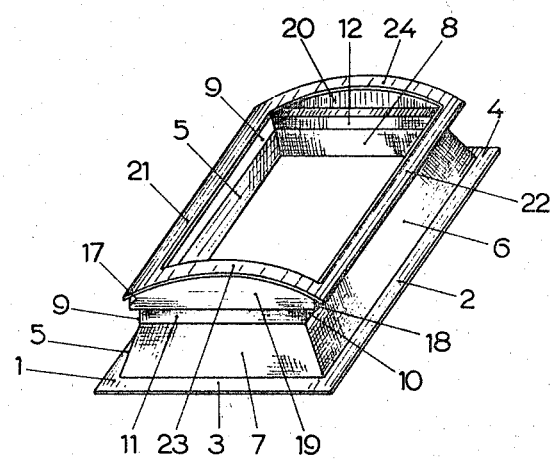
FIG. 1 is a perspective view of a support structure for a light dome according to the invention.
Figure 2:
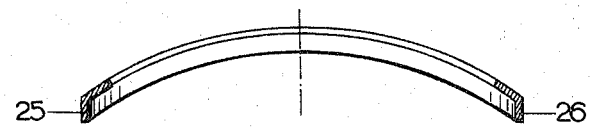
FIG. 2 is a cross-sectional view of a connecting frame cooperating with the support structure according to FIG. 1.
Figure 3:
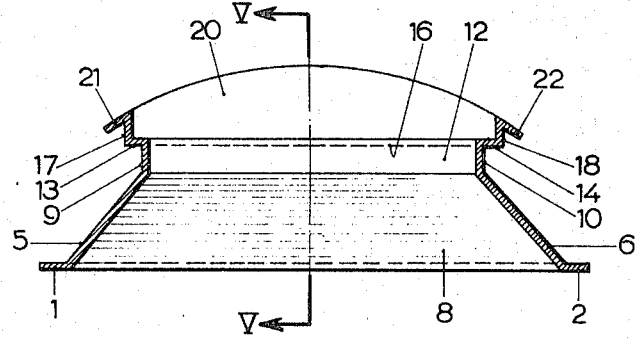
FIG. 3 is a cross-sectional view of the support structure according to FIG. 1 taken along the line III—III in FIG. 5.
Figure 4:
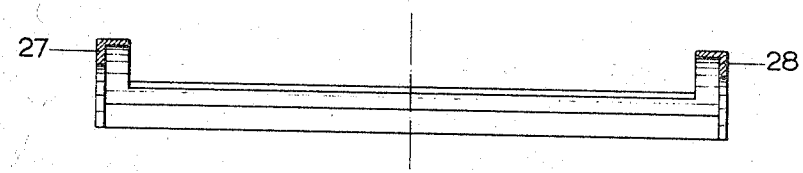
FIG. 4 is a longitudinal section of the connecting frame according to FIG. 2.
Figure 5:
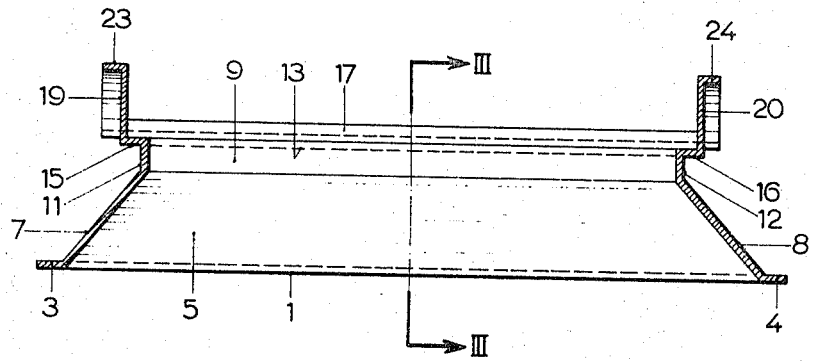
FIG. 5 is a longitudinal section of the support structure according to FIGS. 1 and 3 taken along the line V—V in FIG. 3.

The support structure for a light dome as shown in the drawings comprises a frame which may be connected to a flat portion of a building structure. This frame consists of two frame portions 1, 2 extending in the longitudinal direction and two frame portions 3, 4 extending in the transverse direction. The frame portions 1–4 lie in one and the same plane.

Wall portions 5–8 are connected to the inner edges of the frame portions 1–4 and together form a frustrum of a pyramid. Each of the wall portions 5–8 forms an angle of 45° with the plane of the frame 1–4.

Vertical rims 9–12 of uniform height are connected to the upper edges of the wall portions 5–8. Thus, the upper edges of the rims 9–12 lie in a plane which is parallel to the frame 1–4; of course, frame 1–4 is horizontal after the support structure has been mounted on a building.

Outwardly extending frame portions 13–16 are connected to said vertical rims 9–12 and together form a frame which is parallel to the frame 1–4 and which is therefore horizontal after the support structure has been mounted on a building.

Upwardly extending wall portions 17–20 are connected to the outer edges of the frame portions 13–16. Thus, after the support structure has been mounted on a building, the wall portions 17–20 extend in vertical planes. The longitudinal wall portions 17, 18 have a rectangular shape with a rather small height. The transverse wall portions 19, 20 are defined at their lower side by a straight line, viz the intersecting line between the wall portion 19 and the frame portion 15, and the intersecting line between the wall portion 20 and the frame portion 16, respectively. The wall portions 19, 20 are laterally defined by vertical ribs, which form the intersecting lines between the wall portions 19, 20 and the wall portions 17, 18. The wall portions 19, 20 have arcuate upper edges.

Outwardly extending frame portions 21–24 are connected to the upper edges of the wall portions 17–20 and together form a frame which lies on an imaginary cylindrical surface. This frame 21–24 forms the upper support surface of the support structure. The longitudinal frame portions 21, 22 are parallel to the axis of this cylindrical surface. The transverse frame portions 23, 24 have a central line in the shape of an arc, which corresponds with the arcs formed by the upper edges of the wall portions 19, 20. These arcs lie in planes perpendicular to the axis of the cylindrical surface.

The frame 21–24 forms the upper support surface of the support structure. This upper support surface lies on an imaginary cylindrical surface.

A transparent flat plate may be bent on this frame 21–24. As an alternative, this plate may be pre-bent in the correct shape and thereafter be mounted on the frame 21–24. The dimensions of the plate have to be determined in such manner that, upon bending the plate, the outer edges of this plate correspond with the outer edges of the frame 21–24. Thus, the light dome proper consists of a transparent plate which is bent and thereafter forms a portion of a cylindrical surface, so that this light dome shows the same advantages as the known light domes in respect of draining and self-cleaning.

The transparent plate (not shown in the drawings) is mounted on the upper surface of the frame 21–24 by means of a connecting frame composed of four profiled strips 25–28, which fit on the edges of the frame portions 21–24. This connecting frame 25–28 may be connected to the frame 21–24 by means of suitable connecting means, such as bolts and nuts. In this manner, the danger that cracks would occur near the holes in the light dome is considerably reduced.

The frame 13–16 may support a transparent inner plate (not shown). In this manner the support structure according to the invention will form a double-walled dome with a flat plate resting on the frame 13–16 and a bent plate connected by means of the connecting frame 25–28 on the bent frame 21–24. The two transparent plates do not need to be glued together, so that the advantages of the known double-walled light domes are maintained while its insulating properties are improved.

The above support structure consisting of the parts 1–24 is preferably made of plastic. The connecting frame 25–28 is preferably made of plastic, metal or a combination of these materials.

The invention is not limited to the embodiment shown in the drawings which may be varied in different manners within the scope of the appending claims.

For example, it is not absolutely necessary that the frame 13–16 supporting the transparent inner plate extends in the plane subtending the bent frame 21–24. Furthermore the frame 13–16 may also be bent, so that a bent transparent plate may be used as an inner plate.

What I claim:

1. Support structure for a light dome, comprising a base frame including two longitudinal frame portions and two transverse frame portions, said longitudinal and transverse frame portions lying in one plane and being adapted for connection to a flat portion of a building structure, said longitudinal and transverse frame portions having inner edges; wall portions including an upper edge and a lower edge connected to the inner edges of said frame portions and forming together therewith a frustrum of a pyramid; vertical rims of equal height connected to the upper edges of said wall portions; outwardly extending frame portions connected to said rims and forming together therewith a lower support frame including outer edges which are parallel to said base frame and which are adapted for supporting a transparent plate member; longitudinal and transverse upwardly extending wall portions connected to the outer edges of said frame portions of said lower support frame, said longitudinal upwardly extending wall portions including upper edges and having a rectangular shape and said tranverse upwardly extending wall portions each including an arcuated upper edge, and outwardly extending frame portions connected to the upper edges of said upwardly extending wall portions and forming together therewith an upper support frame which lies on an imaginary cylinder surface and which is adapted for supporting a transparent bent plate member constituting the light dome proper.

References Cited

UNITED STATES PATENTS

| | | | |
|---|---|---|---|
| 913,556 | 2/1909 | Pehl | 52—72X |
| 2,703,060 | 3/1955 | Kiefer | 52—200X |
| 2,834,998 | 5/1958 | Wilder | 52—80X |
| 3,325,951 | 6/1967 | Johnson | 52—200X |
| 3,455,073 | 7/1969 | Kiekhaefer | 52—200 |
| 3,461,625 | 8/1969 | Sandow | 52—200X |

FOREIGN PATENTS

| | | | |
|---|---|---|---|
| 1,523,134 | 3/1968 | France | 52—200 |

FRANK L. ABBOTT, Primary Examiner

S. D. BURKE, Assistant Examiner